Dec. 23, 1958 G. D. MAXWELL 2,866,143

ADJUSTABLE SPEED DRIVE FOR TAPE RECORDING SYSTEMS

Filed Aug. 31, 1956 2 Sheets-Sheet 1

INVENTOR.
GLENN D. MAXWELL

BY Christie, Parker & Hale

ATTORNEYS

Dec. 23, 1958 G. D. MAXWELL 2,866,143

ADJUSTABLE SPEED DRIVE FOR TAPE RECORDING SYSTEMS

Filed Aug. 31, 1956 2 Sheets-Sheet 2

INVENTOR.
GLENN D. MAXWELL

BY

Christie, Parker & Hale
ATTORNEYS 2,866,143
Patented Dec. 23, 1958

2,866,143

ADJUSTABLE SPEED DRIVE FOR TAPE RECORDING SYSTEMS

Glenn D. Maxwell, Arcadia, Calif., assignor to Consolidated Electrodynamics Corporation, Pasadena, Calif., a corporation of California Application August 31, 1956, Serial No. 607,311

8 Claims. (Cl. 318—45)

This invention relates to speed regulated drive systems and, more particularly, is concerned with speed regulated drive systems for magnetic tape records in which the speed can be changed in integral steps.

In magnetic tape recorders and other similar devices in which a record is made on a continuous strip of recording material, it is frequently desirable to have a choice of drive speeds for the tape. While mechanical speed changers using gears, friction wheels, or the like for effecting various ratios of speed reduction are well known and frequently used for this purpose, such speed changers are generally not particularly well adapted for use in a servo-regulated speed drive system for the reason that the speed reducer may introduce additional inertia, backlash and vibration into the system. This is particularly objectionable in tape recording devices where high fidelity of reproduction is required.

The present invention provides a magnetic tape drive which is servo-regulated to maintain extremely constant speed of drive, and yet can be varied in speed of drive by integral steps. Furthermore, the present invention effects the desired speed changes solely by electrical means, thus eliminating the need for any mechanical shifting or mechanical manipulation of any type to effect speed changes.

Briefly, the present invention achieves these results by providing the driven member, such as the tape drive capstan in a tape transport system, with a band of magnetizable material on its surface, the band of magnetizable material having recorded thereon a reference signal. This signal is read off the capstan, amplified, and coupled to a frequency discriminator through switching means which may be used to couple in any combination of one or more frequency doublers for modifying the frequency of the signal applied to the discriminator. The error signal developed by the discriminator is utilized to control a servo motor associated with the capstan drive to regulate the speed of the capstan. The servo motor drives the capstan at such speed that the output signal as modified by the frequency doublers, stabilizes at a predetermined frequency corresponding to the tuned center frequency of the discriminator.

For a better understanding of the invention, reference should be had to the accompanying drawings, wherein.

Figure 1:
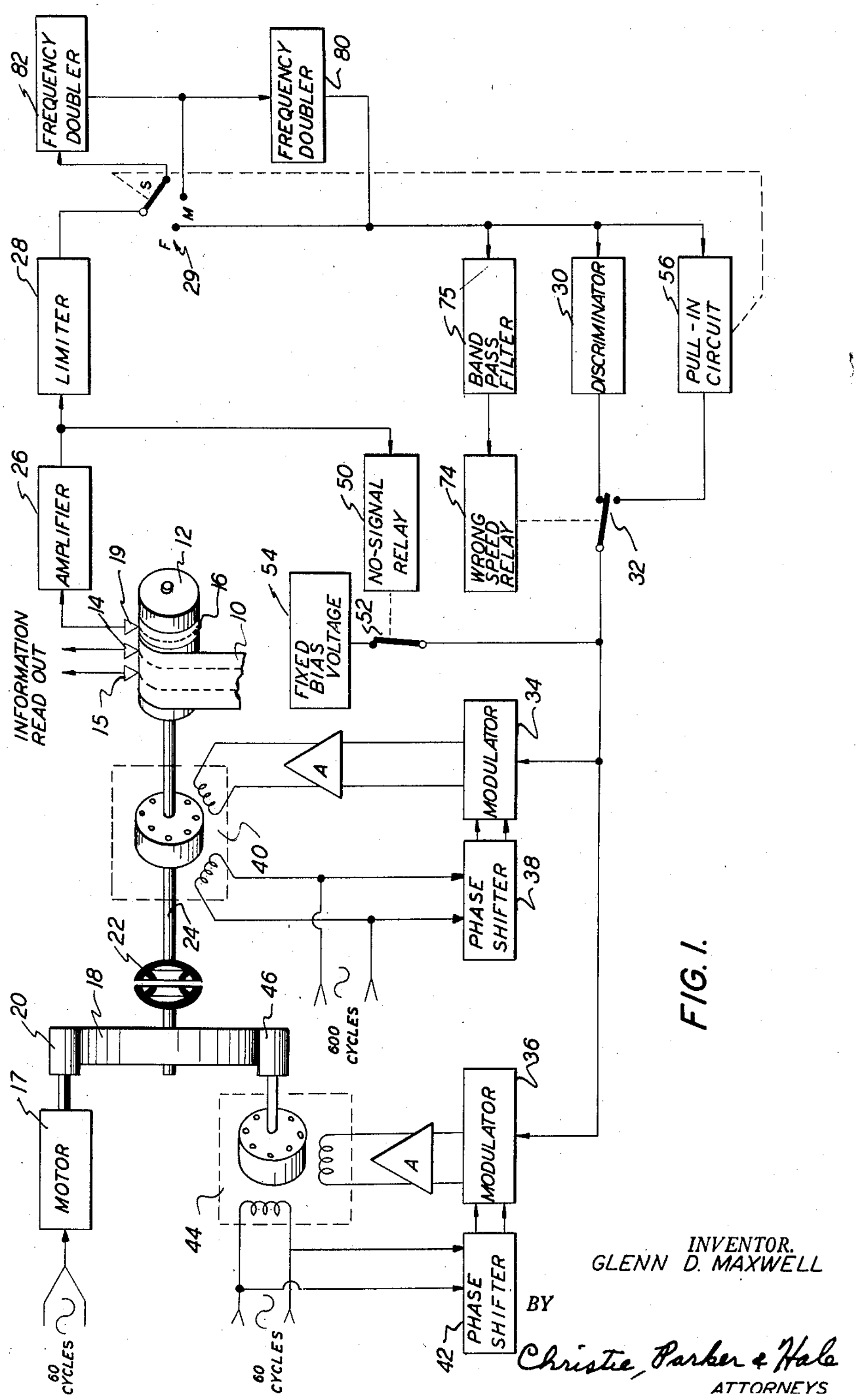
Fig. 1 is a schematic block diagram of the adjustable speed tape drive system of the present invention.

Referring in detail to Fig. 1, the numeral 10 indicates generally a recording medium, such as magnetic tape, which is preferably driven by frictional engagement with a capstan 12. The magnetic tape 10 is provided with one or more recording tracks, there being a suitable recording head, such as indicated at 14 and 15, associated with each of the tracks on the tape.

The periphery of the capstan 12, adjacent one end thereof, is provided with a band of magnetizable material on its surface, such as indicated at 16. This material may be sprayed or painted on the surface or it may be incorporated as an attachment, for example, as a rubber band containing a dispersion of iron oxide powder which is cemented or otherwise firmly attached to the capstan. A constant frequency reference signal is magnetically recorded on the band by any suitable means or method, such as, for example, recording an A.-C. signal on the band during one revolution of the capstan or by placing the capstan in an indexing device and recording a magnetic bit at equally spaced intervals. The frequency of the reference signal on play-back provides a means of sensing variations in the speed of the capstan 12.

Figure 2:
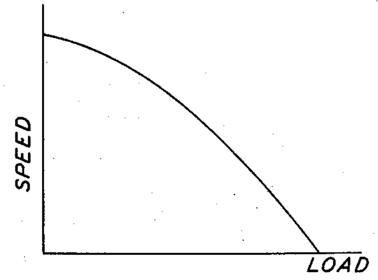
Fig. 2 is a diagram showing the performance characteristic of the main drive motor.

Rotation of the capstan 12 is produced by means of a suitable alternating current motor 17. The output shaft of the motor 17 drives a flywheel 18 by means of a capstan 20 which engages the outer edge of the flywheel 18. The motor 17 preferably has a speed versus load characteristic as shown in Fig. 2. Thus, the speed of rotation of the motor 17 varies substantially linearly with changes in load thereon.

The flywheel 18, which is rotated at reduced speed by means of the speed reduction effected by the relative diameters of the flywheel 18 and the capstan 20, is coupled to the capstan 12 through a fluid coupling 22.

Regulation of the speed of the capstan 12 is achieved by coupling the output from head 19, which senses the reference signal on the magnetic band 16, to a suitable amplifier 26. The amplified signal from the amplifier 26, which is preferably of the order of 10,000 cycles when the capstan is operating at proper speed, is passed through an amplitude limiter 28 and coupled by means of a switch 29 to a frequency discriminator 30. The discriminator 30 may be of any suitable type, such as a Foster-Seeley discriminator. The discriminator 30 provides an output error voltage which varies in magnitude and polarity with changes in frequency of the input above and below the tuned center frequency of the discriminator 30.

The output voltage from the discriminator 30 is coupled by means of the relay-operated switch 32 to a conventional balanced modulator 34 and a similar balanced modulator 36. The modulator 34 has coupled thereto a reference signal derived from a 600 cycle source (not shown) through a phase shifter 38. The modulator 34 produces a 600 cycle output signal that reverses in phase with changes in polarity of the D.-C. voltage from the discriminator 30.

The output of the modulator 34, as well as the 600 cycle reference signal, is applied to a two-phase A.-C. servo motor 40, the rotor of which is carried on the shaft 24 between the fluid coupler 22 and the capstan 12. The effect of the servo motor 40 is to provide immediate change in torque applied to the shaft driving the capstan 12 in response to an error voltage developed at the output of the discriminator 30. The phase shifter 38 is of such a value as to provide the required phase quadrature relationship between the two signals applied to the servo motor 40.

The modulator 36 has coupled thereto a 60-cycle reference signal from a suitable source (not shown) through a phase shifter 42. The output of the modulator 36 is coupled with the 60-cycle reference voltage to a two-phase A.-C. servo motor 44. The output shaft of the servo motor 44 drives a capstan 46 which frictionally engages the flywheel 18. The effect of the servo motor 44 is to assist the drive motor 17 or oppose the drive motor 17, thereby effectively correcting the load imposed on the motor 17 to maintain its speed substantially constant.

Because the servo motor 44 is coupled directly to the flywheel and therefore is part of a relatively high inertia system, it does not respond to the smaller and more rapid variations in the output voltage from the discriminator 30, such as does the servo motor 40. The effect of the servo motor 44 is to maintain a substantially constant load on the motor 17 necessary to maintain the average speed of rotation of the capstan 12 at the necessary level to maintain the output of the discriminator 30 at substantially a zero level. Because of the speed v. load characteristic of the motor 17, as shown by the diagram of Fig. 2, changes in speed of the capstan 12 can be made substantially directly proportional to changes in torque of the servo motor 44.

The servo motor 40, by operating at 600 cycles and by being directly coupled to the capstan 12 which has relatively low inertia, can make extremely rapid accelerations and decelerations in quickly correcting the speed of the capstan 12. By virtue of the fluid coupling 22, the inertia of the system driven by the servo motor 40 can be maintained relatively low so that speed corrections can be made with a minimum of applied torque by the servo motor 40.

Since the starting torque of the motor 17 may be relatively small, and since normally there is no output voltage derived from the discriminator 30 unless there is a signal applied to the input, means is provided for initially operating the servo motors 40 and 44 to assist the motor 17 in bringing the capstan 12 up to the required speed. This is accomplished by a no-signal relay 50 which is actuated by the output from the amplifier 26. The relay 50 drives a switch 52 which normally connects a fixed bias voltage from a bias voltage source 54 to the input to the modulators 34 and 36. The polarity of the bias voltage is such that the torque developed by the servo motors 40 and 44 assists the motor 17 in accelerating the tape drive up to the desired operating speed. As soon as the tape begins to move, a signal is developed at the output of the amplifier 26 which energizes the no-signal relay 50 thereby actuating the relay switch 52 to disconnect the fixed bias voltage from the modulators 34 and 36.

Because the discriminator 30 provides the proper operating characteristic only within a limited frequency range about the tuned center frequency, a special pull-in circuit 56 is provided which is coupled to the output of the limiter 28. A suitable pull-in circuit is shown in more detail in Fig. 3 and preferably comprises a low-pass filter 58 and a high-pass filter 60, the outputs of which are coupled by diodes 62 and 64 across a center-tapped resistor 66. The characteristic of the low-pass filter 58 is such that at frequencies below a predetermined value a D.-C. voltage is developed across half of the resistor 66 by virtue of the diode 62. The voltage developed across the resistor 66 as a function of input frequency by the low-pass filter 58 is shown by the curve 68 in Fig. 4.

The characteristic of the high-pass filter 60 is such that it begins to pass frequencies in the region where the low-pass filter cuts off. As a result a D.-C. voltage of opposite polarity is produced across the resistor 66 which varies as a function of frequency as shown by the curve 70 in Fig. 4. The resultant sum of the voltages developed in response to the low-pass filter 58 and high-pass filter 60 is shown by the dotted line 72 in Fig. 4. It will thus be apparent that a voltage is developed across the resistor 66 which reverses in polarity at a selected predetermined frequency.

The output of the pull-in circuit 56 is coupled by means of the relay-operated switch 32 to the modulators 34 and 36. The switch 32 is operated by a wrong-speed relay 74 controlled by the output of a band pass filter 75 tuned to 10,000 cycles. As soon as a signal is developed at the output of the limiter 28, the pull-in circuit 56 develops a voltage which is applied to the modulators 34 and 36. Thus, a torque is applied to the drive system by the servo motors 40 and 44 which continues to aid the motor 17 until the capstan 12 begins to reach a speed at which the output from the amplifier 26 approaches 10,000 cycles. As the signal approaches 10,000 cycles, the output from the filter 75 increases to a value sufficient to actuate the relay 74 connecting the output of the discriminator 30 through the relay-operated switch 32 to the modulators 34 and 36. The discriminator 30 is more sensitive in operation about the center frequency of 10,000 cycles, and therefore provides much more sensitive control once the drive system has come up to proper speed.

According to the present invention changes in speed at which the capstan 12 is regulated may be modified by means of the switch 29. The switch is arranged to connect in series between the limiter 28 and the discriminator 30, one or more frequency doubler circuits, such as indicated at 80 and 82. By means of the frequency doubler circuits, the signal applied to the input of the discriminator 30 may be made an integral multiple of the frequency of the signal derived from the magnetized band on the capstan 12. As a result, the output of the discriminator is not reduced substantially to zero until the speed of the capstan is reduced sufficiently to bring the frequency of the input of the discriminator back to the center frequency of 10,000 cycles. This means that if a single frequency doubler circuit 80 is inserted into the circuit by means of the switch 29 in its intermediate position, the capstan must run at half its speed. In this case the reference signal derived from the capstan is only 5,000 cycles. Similarly, if both the frequency doublers 80 and 82 are connected in series by means of the switch 29 in its extreme right position, the capstan must run at a speed so as to produce a reference signal of 2,500 cycles. While frequency doubler circuits are specifically shown, other types of frequency converting circuits may be used, such as well known divider circuits. The divider circuits of course would result in an increase of the capstan in speed in contrast to the decrease of the capstan in speed produced by the frequency doublers.

Figure 3:
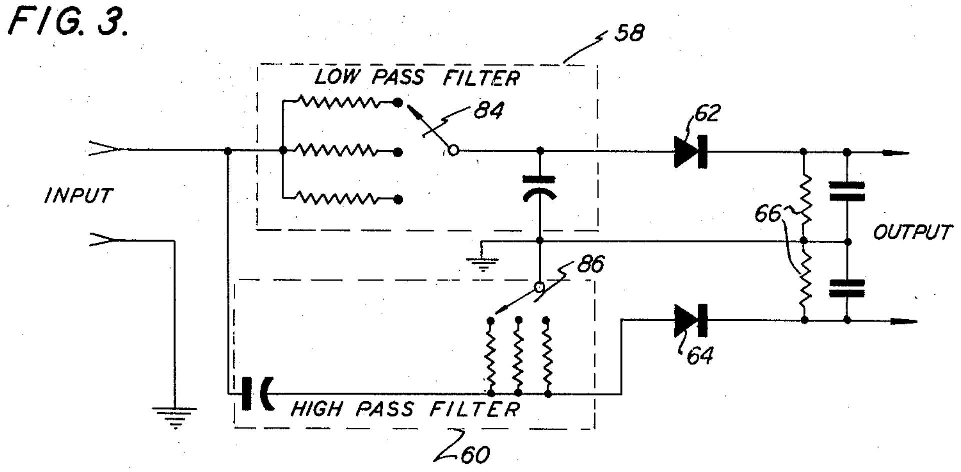
Fig. 3 is a schematic block diagram of a suitable pull-in circuit for use in the system of Fig. 1.
Figure 4:
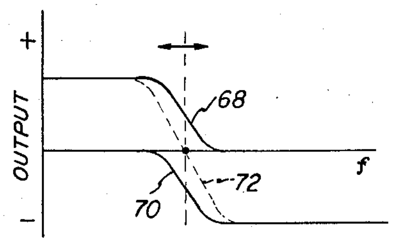
Fig. 4 is a diagram used in explaining the operation of the pull-in circuit of Fig. 3.

It will be appreciated that when one or more doubler circuits are connected in by means of the switch 29, the relay 74 will drop out, and thereby connect the pull-in circuit 52 to the input of the modulators 34 and 36. Since the speed regulating system now wants to stabilize at a speed where the reference signal derived from the capstan through the amplifiers 26 and 28 is at a fraction of its previous value, or a multiple, as the case may be, it is necessary that the pull-in circuit be tuned to a different center frequency value. For this reason, as shown in Fig. 3, the pull-in circuit is provided with a selector switch in both the low-pass filter 58 and high-pass filter 60, such as indicated at 84 and 86, respectively. The switches 84 and 86 are ganged together and ganged with the switch 29. Switches 84 and 86 are arranged to switch in one of three different values of resistors into the filter circuit so as to shift the cross-over or null point of the output of the pull-in circuit to a different frequency value.

What is claimed is:

1. Apparatus for controlling the speed of rotation of a rotatable member comprising a main drive motor having a speed that varies substantially in proportion to the load thereon, a flywheel driven by the main drive motor, means for coupling the rotatable member to the flywheel, a servomotor rotatably coupled to the flywheel, means for generating a periodic reference signal having a frequency proportional to the speed of the rotational member, a plurality of frequency doubler circuits, a frequency discriminator, means for selectively coupling a predetermined number of said frequency doubler circuits between said reference signal generating means and the discriminator, means for modulating the output of the discriminator, and means for controlling the servomotor in response to the modulated signal derived from the discriminator.

2. Apparatus for controlling the speed of rotation of a rotatable member comprising a main drive motor having a speed that varies substantially in proportion to the load thereon, a flywheel driven by the main drive motor, means for coupling the rotatable member to the flywheel, a servomotor rotatably coupled to the flywheel, means for generating a periodic reference signal having a frequency proportional to the speed of the rotational member, a plurality of frequency doubler circuits, a frequency discriminator, means for selectively coupling a predetermined number of said frequency doubler circuits between said reference signal generating means and the discriminator, and means for controlling the servomotor in response to the signal derived from the discriminator.

3. Apparatus as defined in claim 2 further comprising relay means including a tuned circuit for coupling the relay to the output of the doublers, and a pull-in circuit including a high-pass filter and a low-pass filter coupled to a reference signal for generating a large error signal when the frequency is shifted substantially from a design center frequency, the output of the pull-in circuit and the output of the discriminator being selectively coupled to the motor control means by the relay.

4. Apparatus for controlling the speed of rotation of a rotatable member comprising a main drive motor having a speed that varies substantially in proportion to the load thereon, a flywheel driven by the main drive motor, means for coupling the rotatable member to the flywheel, a servomotor rotatably coupled to the flywheel, means for generating a periodic reference signal having a frequency proportional to the speed of the rotational member, a plurality of frequency doubler circuits, means for producing an error signal that varies in magnitude and polarity with changes in frequency of the input, means for selectively coupling a predetermined number of said frequency doubler circuits between said reference signal generating means and the error signal producing means, and means for controlling the servomotor in response to the signal derived from the error signal producing means.

5. Apparatus for controlling the speed of rotation of a rotatable member comprising a main drive motor having a speed that varies substantially in proportion to the load thereon, means for coupling the rotatable member to the main drive motor, a servomotor rotatably coupled to the main drive motor, means for generating a periodic reference signal having a frequency proportional to the speed of the rotational member, a plurality of frequency doubler circuits, means for producing an error signal that varies in magnitude and polarity with changes in frequency of the input, means for selectively coupling a predetermined number of said frequency doubler circuits between said reference signal generating means and the error signal producing means, and means for controlling the servomotor in response to the modulated signal derived from the error signal producing means.

6. Apparatus for controlling the speed of rotation of a shaft, comprising means for providing a magnetizable surface around a portion of the shaft, the magnetizable surface having a periodic reference signal recorded thereon, transducer means for reading out the signal, a plurality of frequency changing means, a discriminator for producing an output error signal that varies in magnitude and polarity with changes in the frequency of the input thereto, switching means for selectively coupling predetermined combinations of said frequency changing means between the output of the transducer means and the input to the discriminator, whereby a predetermined relationship between the frequency of the periodic signal read out from the magnetizable surface portion of the shaft and the input to the discriminator is provided, and servomotor means responsive to the output of the discriminator for regulating the speed of the shaft to reduce the discriminator output to zero.

7. Apparatus for controlling the speed of rotation of a shaft, comprising means for providing a magnetizable surface around a portion of the shaft, the magnetizable surface having a periodic reference signal recorded thereon, transducer means for reading out the signal, a plurality of frequency changing means, means for producing an output error signal that varies in magnitude and polarity with changes in the frequency of the input thereto, switching means for selectively coupling predetermined combinations of said frequency changing means between the output of the transducer means and the input to the error signal producing means, whereby a predetermined relationship between the frequency of the periodic signal read out from the magnetizable surface portion of the shaft and the input to the error signal producing means is provided, and servomotor means responsive to the output of the error signal producing means for regulating the speed of the shaft to reduce the error signal to zero.

8. Apparatus for controlling the speed of rotation of a shaft, comprising means for providing a periodic reference signal that varies in frequency with speed of rotation of the shaft, a plurality of frequency changing means, means for producing an output error signal that varies in magnitude and polarity with changes in the frequency of the input thereto, switching means for selectively coupling predetermined combinations of said frequency changing means between the output of the reference signal producing means and the input to the error signal producing means, whereby a predetermined relationship between the frequency of the periodic signal and the input to the error signal producing means is provided, and shaft speed control means responsive to the output of the error signal producing means for regulating the speed of the shaft to reduce the error signal to zero.

References Cited in the file of this patent

UNITED STATES PATENTS 2,604,321 Williams ............ July 22, 1952
2,783,426 Pittman .............. Feb. 26, 1957